United States Patent

Nobumoto et al.

[11] Patent Number: 4,488,625
[45] Date of Patent: Dec. 18, 1984

[54] CLUTCH CONTROL SYSTEM FOR AUTOMOBILES

[75] Inventors: Kazutoshi Nobumoto; Shizuo Sumida, both of Hiroshima, Japan

[73] Assignee: Toyo Kogyo Co., Ltd., Hiroshima, Japan

[21] Appl. No.: 373,161

[22] Filed: Apr. 29, 1982

[30] Foreign Application Priority Data

May 1, 1981 [JP] Japan ................................. 56-66269
Sep. 3, 1981 [JP] Japan ................................. 56-138886

[51] Int. Cl.³ ............................................ B60K 41/22
[52] U.S. Cl. ................................ 192/3.58; 192/103 R
[58] Field of Search ............. 192/0.032, 0.033, 0.075, 192/0.076, 0.096, 0.098, 3.57, 3.58, 103 R, 0.052

[56] References Cited

U.S. PATENT DOCUMENTS

| | | | |
|---|---|---|---|
| 3,004,447 | 10/1961 | Sand | 192/0.076 X |
| 3,006,213 | 10/1961 | Wilson | 192/0.076 X |
| 3,817,358 | 6/1974 | Hess | 192/0.033 |
| 4,172,505 | 10/1979 | Rabus et al. | 192/0.076 X |
| 4,248,333 | 2/1981 | Matsumoto et al. | 192/0.033 X |
| 4,343,387 | 8/1982 | Hofbauer | 192/0.076 |
| 4,401,200 | 8/1983 | Heidemeyer et al. | 192/0.076 |
| 4,403,682 | 9/1983 | Norris et al. | 192/0.076 X |

FOREIGN PATENT DOCUMENTS 49-48694 12/1974 Japan.

*Primary Examiner*—George H. Krizmanich
*Attorney, Agent, or Firm*—Fleit, Jacobson, Cohn & Price

[57] ABSTRACT

A clutch control system for automobiles comprising a clutch actuating member for actuating a clutch positioned between an engine output shaft and a transmission input shaft, and a suction pressure operated actuator for moving a clutch actuating member to a clutch releasing position. A detecting circuit is provided for detecting a negative differential coefficient of the engine speed and generating a corresponding output. A vacuum control valve is provided in a line to the clutch actuator to operate the clutch release. The line is also provided with a holding valve which is closed when the detecting circuit detects the negative differential coefficient of the engine speed to thereby stop the clutch engaging movement of the actuator momentarily so as to prevent the engine speed from falling off.

8 Claims, 15 Drawing Figures

(a)

(b)

(c)

(a)

(b)

(c)

(a)
ENGINE SPEED (b)
DIFFERENTIAL COEFFICIENT OUTPUT (c)
CLUTCH LEVER STROKE

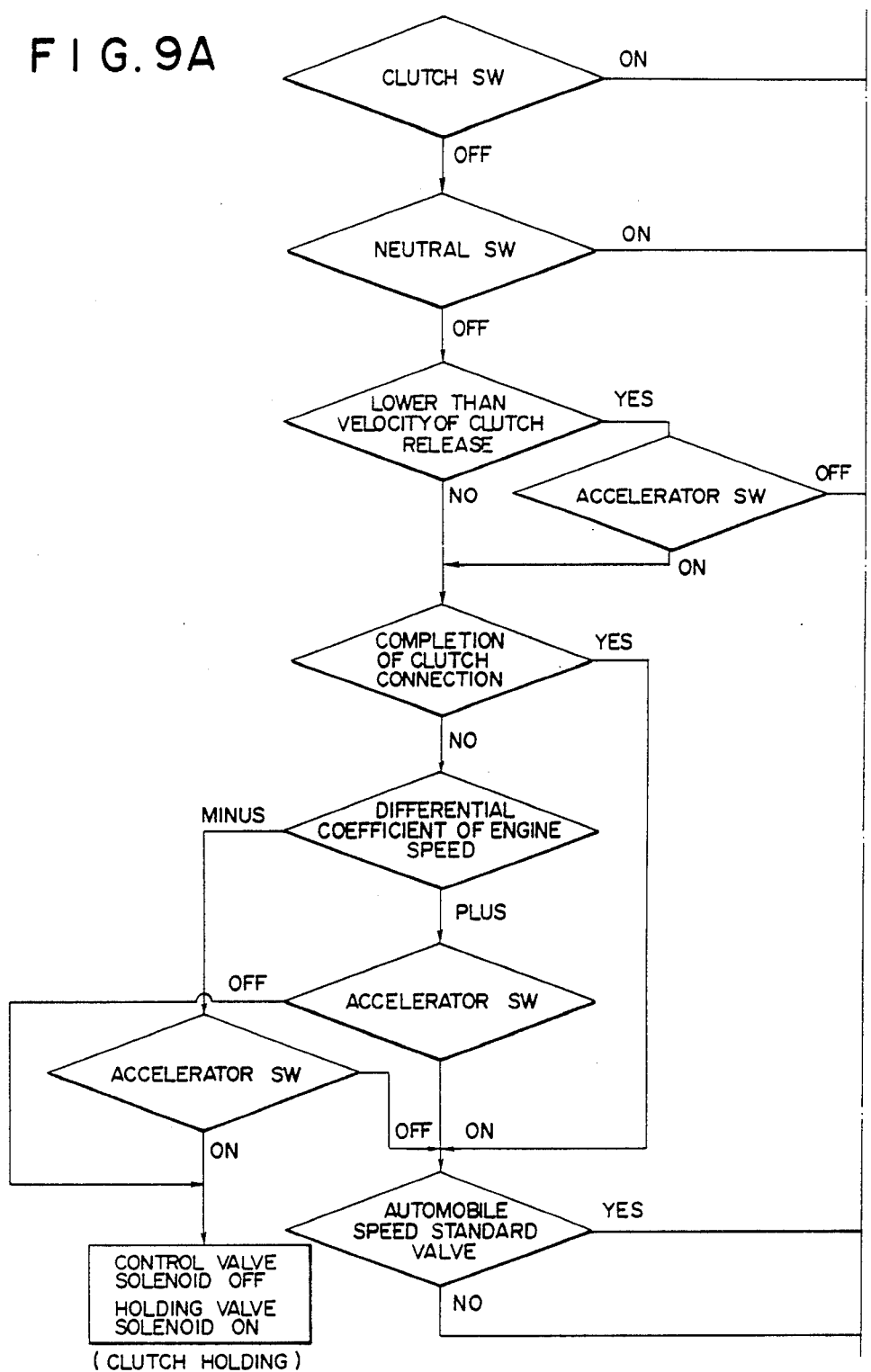

( CLUTCH RELEASE )

DIFFERENTIAL COEFFICIENT > STANDARD VALVE (K₁)

YES → SPEED CONTROL SOLENOID ON

NO

CONTROL VALVE SOLENOID ON
HOLDING VALVE SOLENOID OFF ( CLUTCH CONNECTION )

CLUTCH CONTROL SYSTEM FOR AUTOMOBILES

BACKGROUND OF THE INVENTION

The present invention relates to a clutch control system for automobiles, and in particular, to a clutch control system in which clutch control is carried out automatically in response to a change in the engine speed.

Conventionally, it has been proposed, for example by Japanese patent publication No. 49-48694 to control clutch engagement automatically by providing a fluid pressure which is adjusted so that the clutch actuating member takes an operative position proportionally corresponding to the engine speed. The proposed clutch control device performs the clutch control not only in response to the engine speed but also in response to the rate of deceleration of the engine speed in such a manner that the change in clutch actuating fluid pressure in response to a change in the engine speed takes place with a certain phase advance with respect to the change in the engine speed to thereby eliminate any delay in operation of the clutch actuator and prevent engine stop or engine overrunning. The known device is, however, disadvantageous in that it is intended essentially to control the stroke of the clutch actuating member in proportion to the engine speed so that the clutch engagement is affected by the worn condition and temperature of the clutch friction members.

SUMMARY OF THE INVENTION

The present invention has been accomplished in view of the aforementioned problems of the conventional devices, and has as an object to provide a clutch control system for automobiles in which clutch engagement is performed in a manner most suitable to the engine load condition.

Another object of the present invention is to provide a clutch control system in which the operating speed of the clutch actuating member can be controlled in accordance with the rate of change of the engine speed.

A further object of the present invention is to provide a clutch control system which can perform a smooth engagement of the clutch.

According to present invention, the above and other objects can be accomplished by a clutch assembly comprising a driving member and a driven member which are adapted to be brought into a frictional engagement with each other, clutch actuating means for bringing said driving and driven members into mutual frictional engagement, control means including detecting means for detecting the rate of decrease in engine speed and producing an output representing the engine speed decrease rate, and means responsive to the output of the detecting means and stopping movement of said clutch actuating means when the decrease in the engine speed is detected during engaging operation of the clutch actuating means. In accordance with the features of the present invention, when the engine speed starts to decrease during the clutch engaging operation due to an abrupt increase in the engine load, the decrease in the engine speed is detected by the detecting means and a feedback signal is applied to the clutch actuating means to thereby hold the clutch friction members in a half-engagement position until the engine speed recovers. Since the feedback signal is considered as including the effects of the wear and the temperature of the friction member, a smooth clutch engagement is ensured irrespective of the conditions of the clutch members.

In a preferable aspect of the present invention, the detecting means is also able to detect the rate of increase in the engine speed and the control means includes means to allow the clutch actuating means to perform the clutch engaging operation. Preferably, the clutch actuating means comprises a fuid operated actuator and the control means may then include valve means for maintaining a constant fluid pressure which is applied to the actuator.

According to a further aspect of the present invention, the control means includes a differential circuit which produces a differential signal corresponding to the rate of change of the engine speed, first means for controlling speed of the clutch release member in accordance with the differential signal, discriminating means for detecting that the rate of change in the engine speed is negative and producing a negative rate signal, and second means for stopping the clutch actuating means in accordance with the negative rate signal. With this arrangement, it becomes possible to control the rate of engagement of the clutch in accordance with the rate of change in the engine speed.

The above and other objects and features of the present invention will become apparent from the following descriptions of preferred embodiments taking reference to the accompanying drawings, in which.

Figure 4:
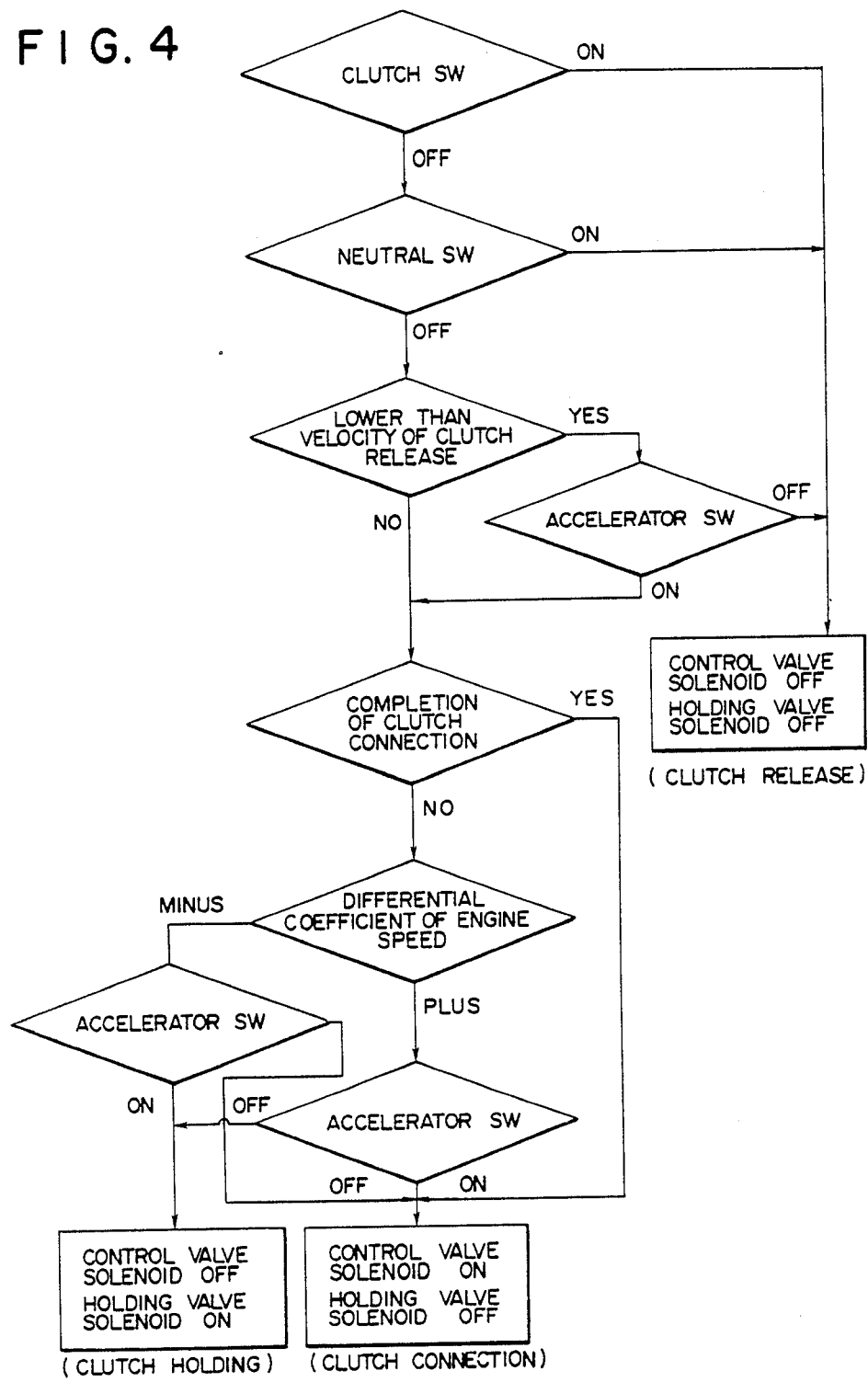
Figure 5:
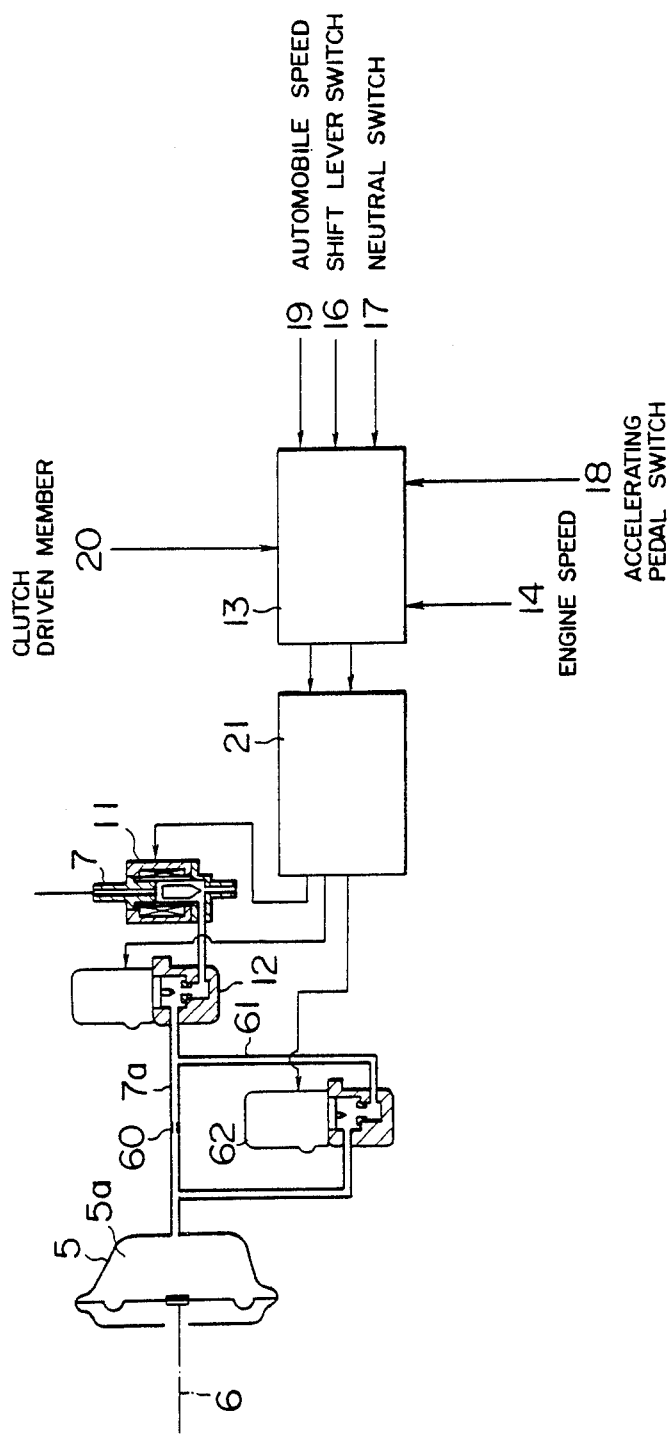
Figure 6:
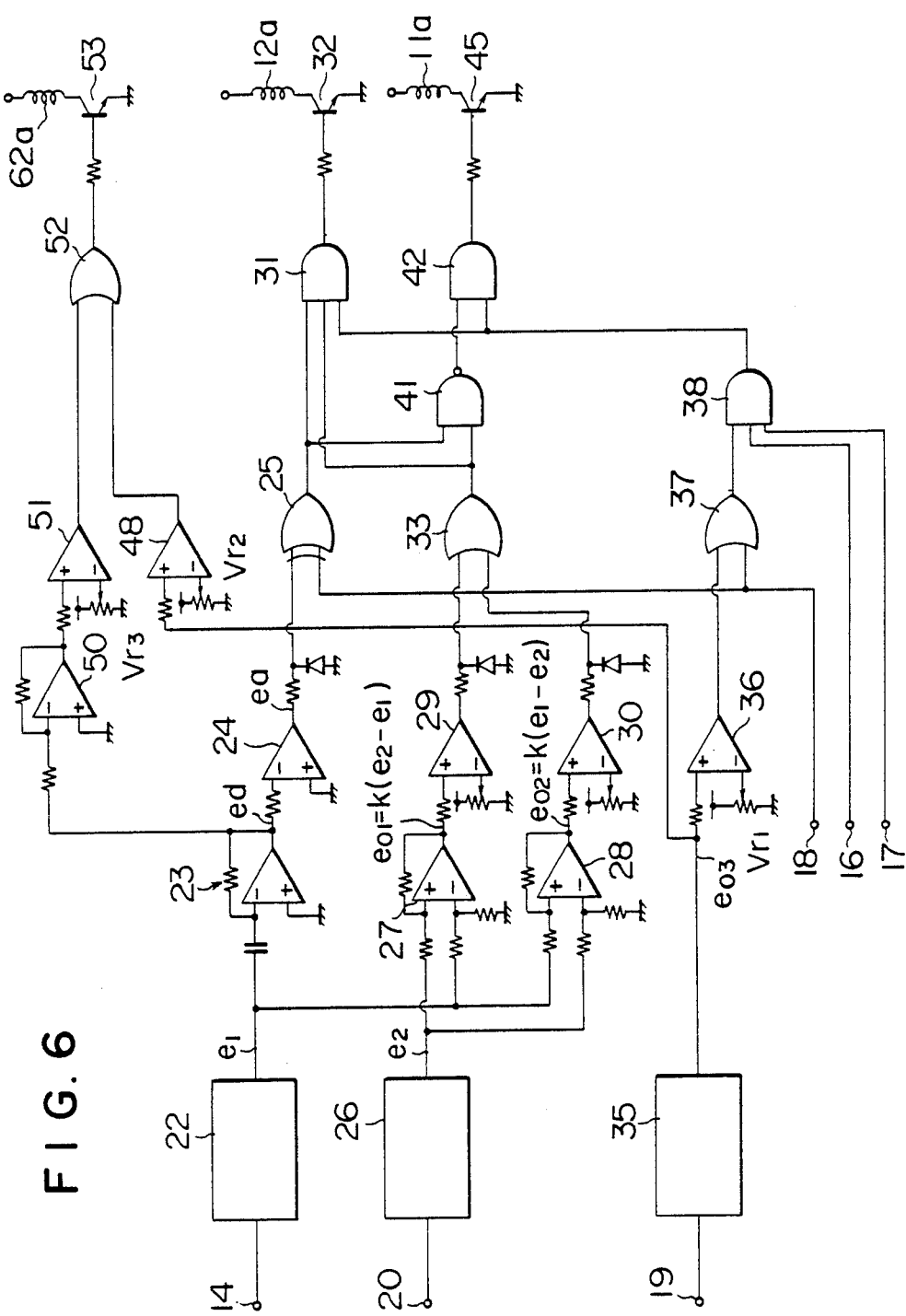
Figure 7:
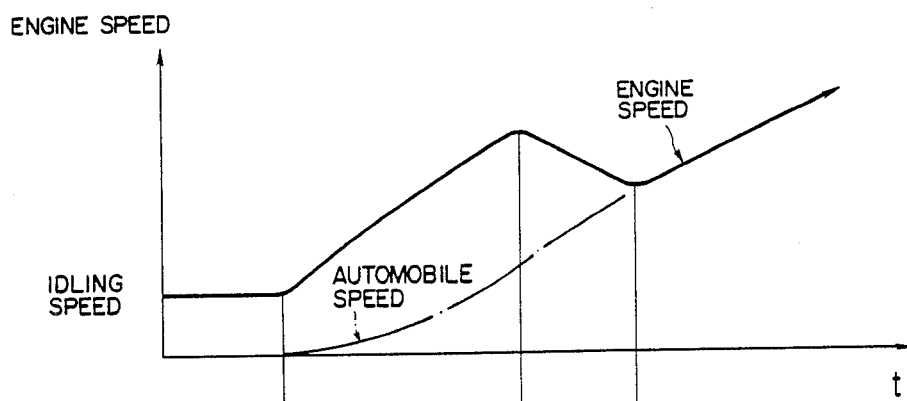
Figure 7:
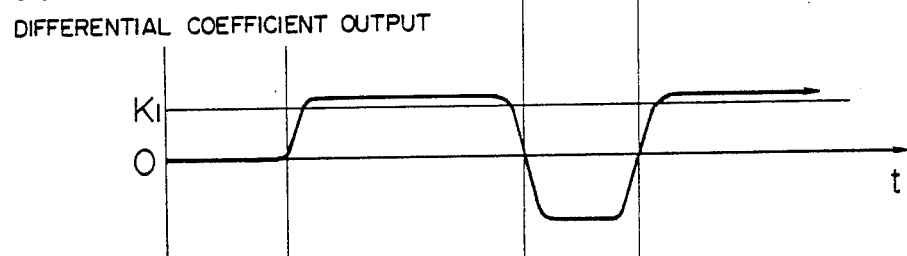
Figure 7:
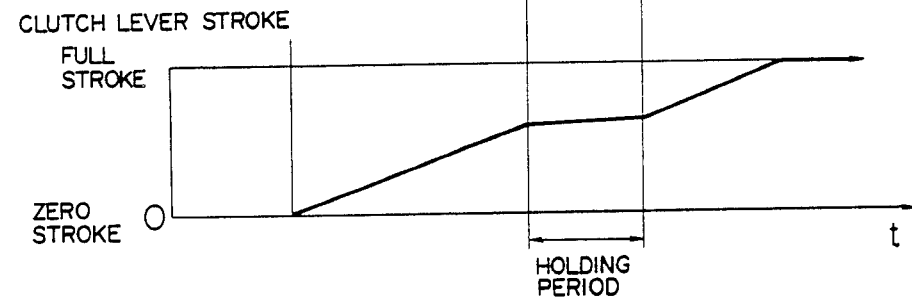
Figure 8:
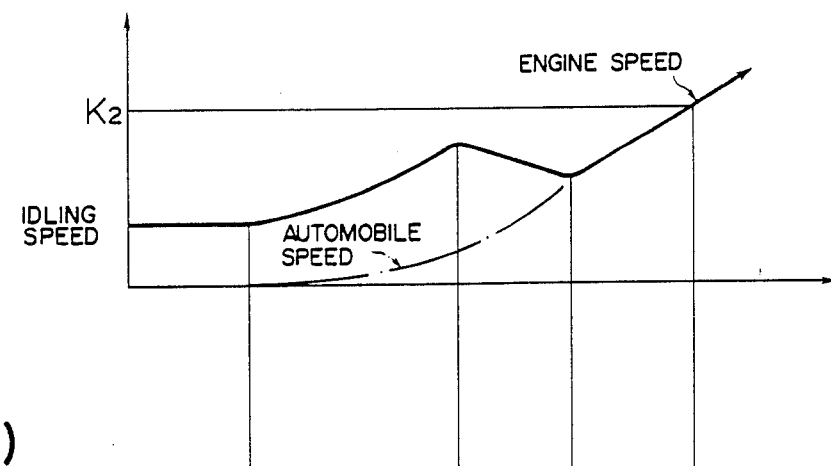
Figure 8:
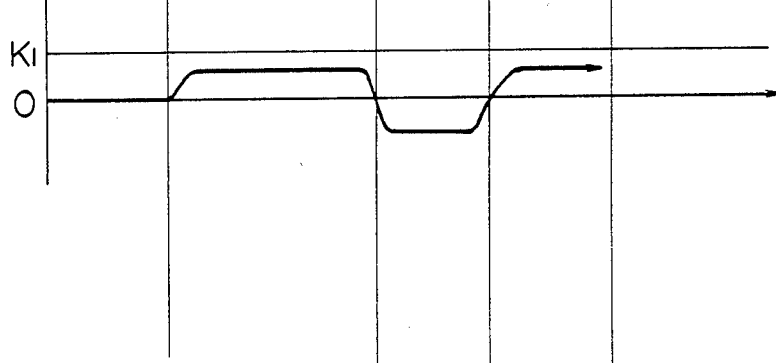
Figure 8:
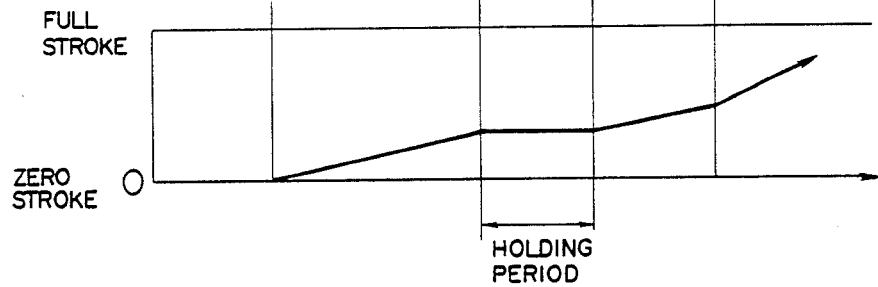
Figure 9B:
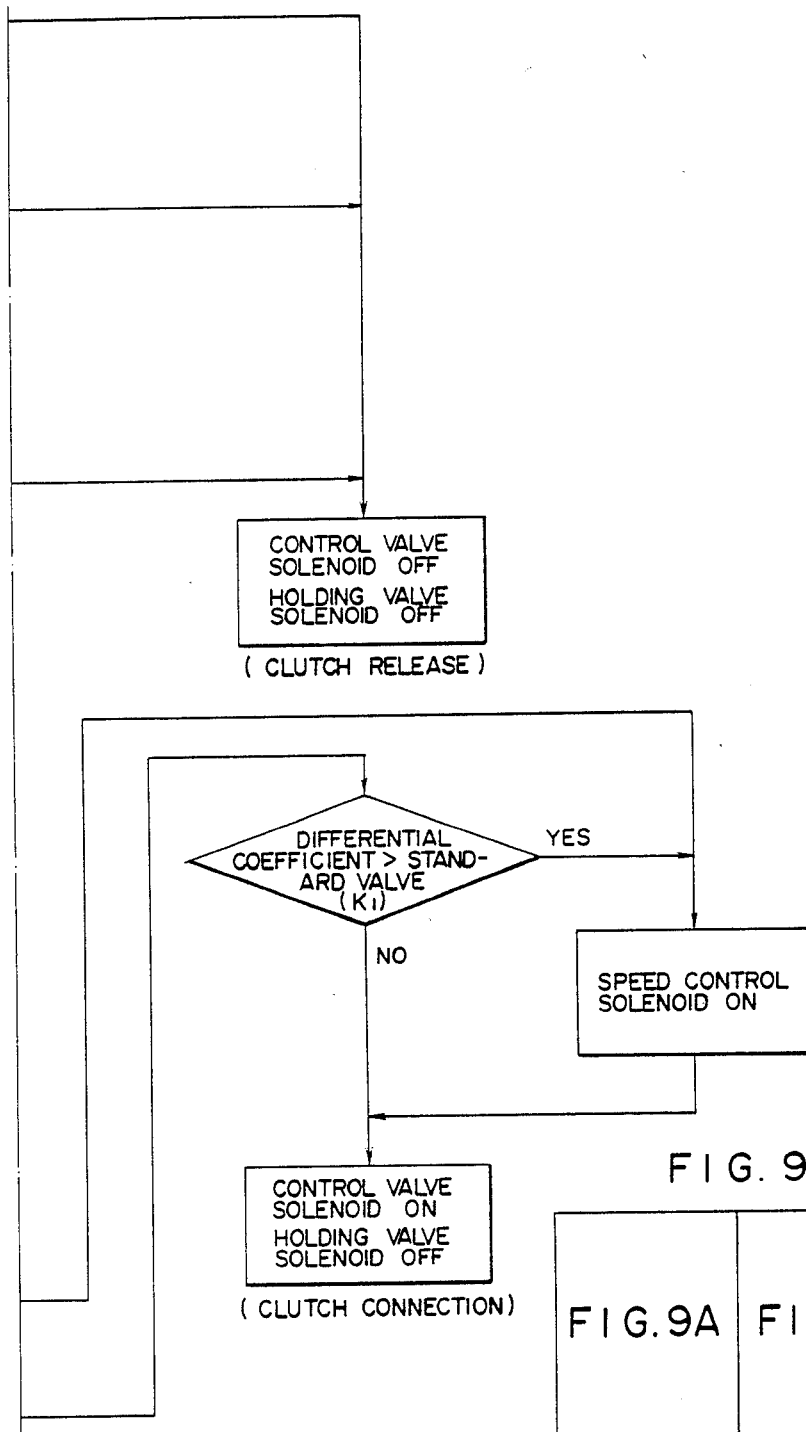
Figure 9:
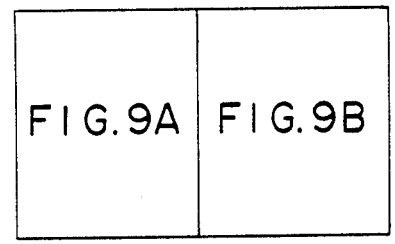

FIGS. 3(a), (b), (c) are diagrams showing examples of control patterns;

FIG. 4 is a flow chart of the control in an embodiment using a microcomputer for the control circuit;

FIG. 5 is a schematic view of the clutch control system showing another embodiment of the present invention;

FIG. 6 is a control circuit used in the embodiment of FIG. 5;

FIGS. 7(a), (b), (c) and FIGS. 8(a), (b), (c) are diagrams showing examples of control patterns in the embodiment of FIG. 5; and FIG. 9 is a flow chart of control in an embodiment using a microcomputer for the control circuit in the system shown in FIG. 6.

DESCRIPTION OF THE EMBODIMENT

Figure 1:
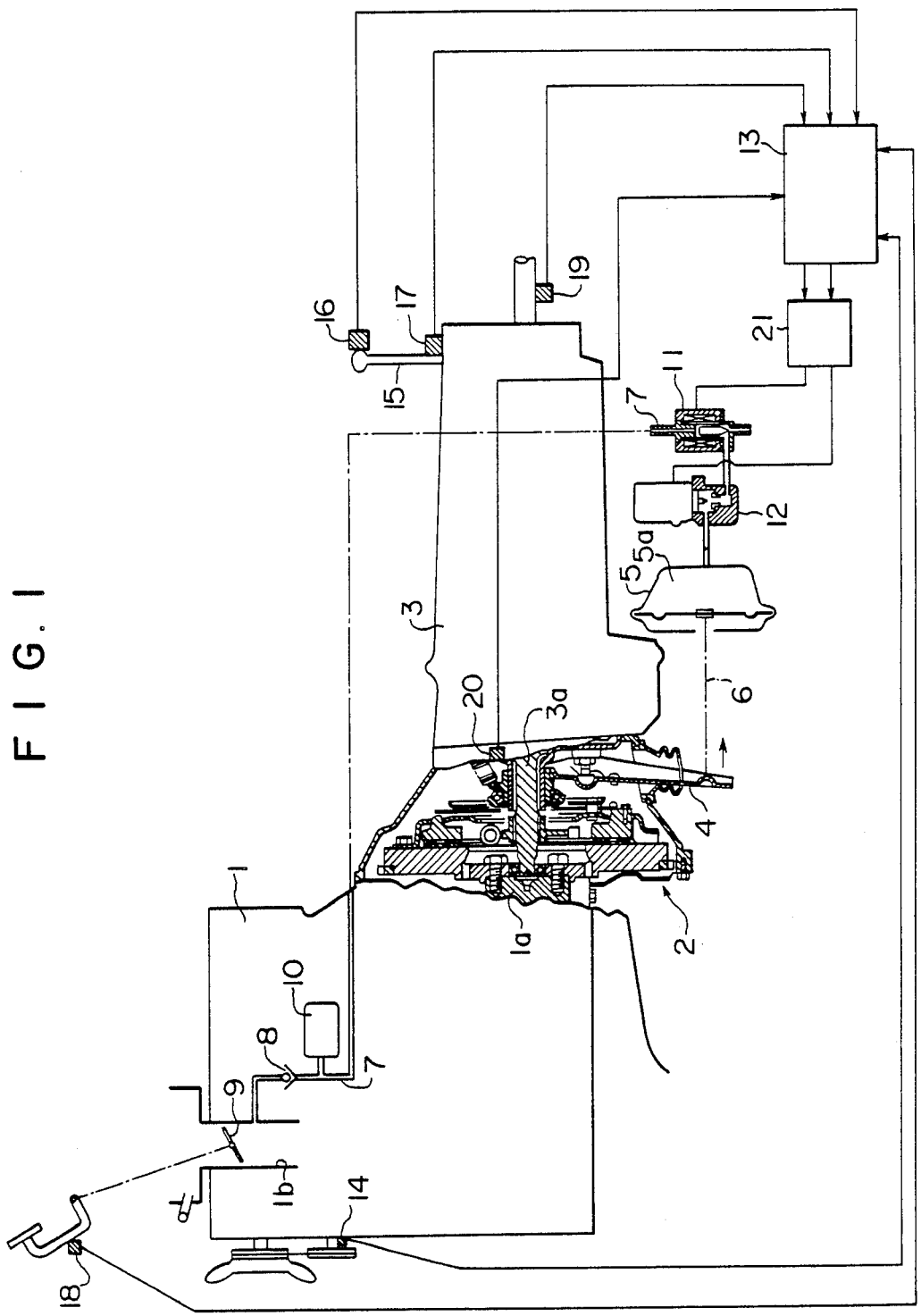
FIG. 1 is a schematic view showing a clutch control system in accordance with one embodiment of the present invention.

Referring to the drawings, particularly to FIG. 1, the engine 1 shown therein has an output shaft 1a which is connected with an input shaft 3a of a transmission 3 through a clutch assembly 2. The clutch assembly 2 has a clutch actuating member 4 which is associated with the clutch assembly 2 so that the member 4 re-leases the clutch when it is moved in the direction shown by an arrow. The clutch assembly 2 is provided with a spring which functions to engage the clutch when the actuating force is removed from the member 4. The lower end of the clutch actuating member 4 is connected with a diaphragm actuator 5 through a rod 6. The actuator 5 has a vacuum chamber 5a which is connected with the engine intake passage 1b downstream of the throttle valve 9 through a vacuum line 7 having a check valve 8. The vacuum line 7 is provided with a vacuum tank 10.

In order to control the suction pressure introduced into the vacuum chamber 5a, the vacuum line 7 is provided with a control valve 11 and a holding valve 12. The control valve 11 is of an electromagnetic type and functions to connect the vacuum chamber 5a alternately to the vacuum line 7 and the atmosphere. More specifically, when the holding valve 12 is opened, the control valve 11 connects the vacuum chamber 5a with the vacuum line 7 when it is energized but opens the chamber 5a to the atmosphere when deenergized. The holding valve 12 functions when energized to close the vacuum line 7 leading to the vacuum chamber 5a so as to interrupt induction of the suction pressure to the vacuum chamber 5a.

A control circuit 13 is provided to operate the control valve 11 and the holding valve 12. The control circuit 13 receives signals from a pulse generator 14 detecting the engine speed, a clutch switch 16 which is turned ON when the driver's hand has been removed from the transmission shift lever 15, a neutral switch 17 which is turned ON when the transmission 3 is not in the neutral position, an accelerator pedal switch 18 which is turned ON when the accelerator pedal has been actuated, a speed pulse generator 19 detecting the automobile speed and a pulse generator 20 detecting the speed of the driven member of the clutch assembly 2. The output of the control circuit 13 is transferred to the control valve 11 and to the holding valve 12 through a servo amplifier 21.

Figure 2:
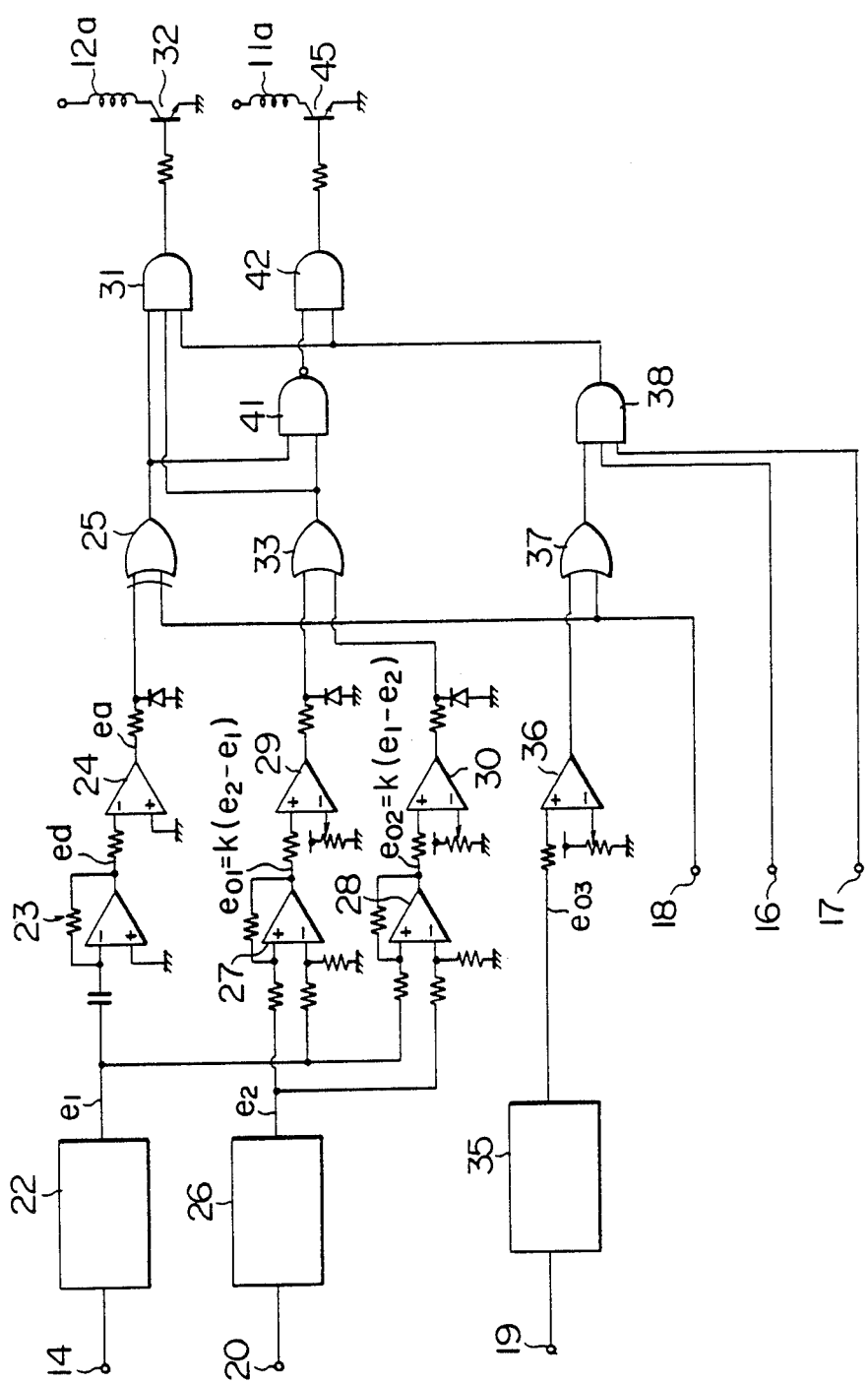
FIG. 2 is a control circuit used in the embodiment of FIG. 1.

FIG. 2 shows the details of the control circuit 13. The output of the pulse generator 14 is applied to a frequency-voltage transducer 22 which generates a voltage output $e_1$. The output of the frequency-voltage transducer 22 is then applied to a differentiation circuit 23 which generates an output $e_d$ which is in turn applied to a comparator 24 where the signal $e_d$ is compared with a zero voltage. Thus, the comparator 24 generates a positive output $e_a$ when the differential coefficient of the engine revolution is positive and a zero output $e_a$ when the differential coefficient of the engine revolution is negative. The output $e_a$ of the comparator 24 is applied to an exclusive OR circuit 25 which is also applied with a signal from the accelerator pedal switch 18.

The pulse generator 20 detects the speed of the driven member of the clutch assembly 2. The output of the pulse generator 20 is introduced to a frequency-voltage transducer 26 which generates a voltage output $e_2$. The output $e_2$ is applied to comparators 27 and 28. The output $e_1$ of the frequency-voltage transducer 22 is also to the comparators 27 and 28. Thus, the comparator 27 generates an output $e_{01}=k(e_2-e_1)$ and the comparator 28 generates an output $e_{02}=k(e_1-e_2)$. The output $e_{01}$ of the comparator 27 is applied to a comparator 29 where it is compared with a reference voltage. The comparator 29 generates a binary output. In the same way, the output $e_{02}$ of the comparator 28 is applied to a comparator 30 in order to be compared with a reference voltage. The comparator 30 thus generates a binary output. The outputs of the comparators 29 and 30 are transferred to an OR circuit 33. The output of the OR circuit 33 functions to judge whether the speeds of the driving member and the driven member of the clutch assembly 2 are the same or not by producing an output which turns to a low level when the speeds of a driving and driven member of the clutch assembly 2 are the same and to a high level when the speeds are not the same.

The output of the speed pulse generator 19 is applied to a frequency-voltage transducer 35 which generates a voltage signal $e_{03}$ proportional to the automobile speed. The voltage signal $e_{03}$ is applied to a comparator 36 in order to be compared with a reference voltage. When the automobile speed is higher than a predetermined value, the comparator 36 generates a high level signal which is applied to an OR circuit 37. The OR circuit 37 is connected with the accelerator pedal switch 18 to receive a signal therefrom. The output of the OR circuit 37 is transferred to an AND circuit 38. Outputs of the clutch switch 16 and the neutral switch 17 are also transferred to the AND circuit 38. The signal from the comparator 24 to the exclusive OR circuit 25 represents the differential coefficient of the engine speed. When the accelerator pedal is actuated and the differential coefficient of the engine speed is negative, the exclusive OR circuit 25 generates a high level signal. Outputs of both the exclusive OR circuit 25 and the OR circuit 33 are transferred to a NAND circuit 41. An output of the NAND circuit 41 is transferred to an AND circuit 42. The AND circuit 38 judges whether the automobile speed is higher than a predetermined value or not, and its output is transferred to an AND circuit 42. The output of the AND circuit 42 is applied to the base of a switching transistor 45. The switching transistor 45 functions to control the current to a solenoid 11a of the control valve 11. When the solenoid 11a is energized, the vacuum chamber 5a of the diaphragm actuator 5 is opened to the atmosphere and the clutch is engaged.

The outputs of the exclusive OR circuit 25, the OR circuit 33 and the AND circuit 38 are applied to an AND circuit 31. The AND circuit 31 produces an output which is applied to the base of the switching transistor 32. The transistor 32 controls the current to the solenoid 12a of the holding valve 12. When the solenoid 12a is energized, the holding valve 12 is closed to maintain the pressure in the vacuum chamber 5a of the diaphragm means 5.

Figure 3:
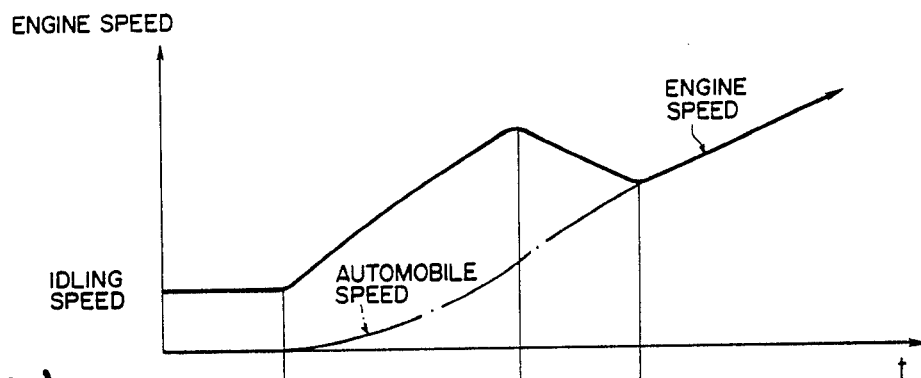
Figure 3:
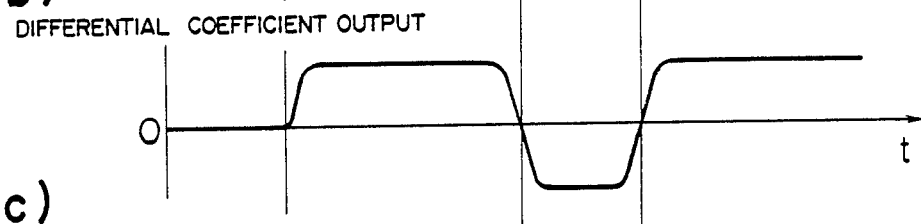
Figure 3:
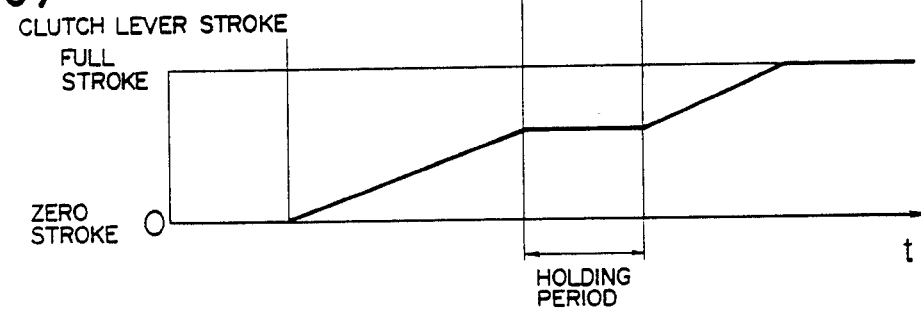

The operation of the control circuit 13 will now be described taking reference to FIG. 3. When the accelerator pedal is actuated to start the automobile, the engine speed starts to increase from the idling speed as shown by a solid line in FIG. 3(a). At the same time, the accelerator pedal switch 18 turns ON so that the accelerator pedal signal is applied to the exclusive OR circuit 25 and the OR circuit 37. Since the time differential coefficient of the engine speed is positive, the output $e_a$ of the comparator 24 is at a high level and the exclusive OR circuit 25 generates a low level signal. At the starting period of the automobile wherein the vehicle speed is lower than the predetermined value, the AND circuit 38 generates a high level signal. At this time, the clutch is not fully connected so that the OR circuit 33 generates a high level signal. In this state, the NAND circuit 41 and the AND circuit 42 generate high level signals, so that the solenoid 11a of the control valve 11 is energized and the control valve 11 is opened to the atmosphere. The AND circuit 31 generates a low level signal so that the solenoid 12a of the holding valve 12 is not energized. Thus, the holding valve 12 is opened and the vacuum chamber 5a of the diaphragm 5 is communicated with the atmosphere through the control valve 11 so that the clutch starts to be engaged. As the clutch is engaged gradually, the automobile speed goes up gradually as shown by a broken line in FIG. 3(a).

As the automobile starts to run and the engine load increases, the differential coefficient of the engine speed decreases. If the engine load is excessive, the engine speed decreases as shown by the solid line in FIG. 3(a). The decrease of the engine speed is detected in terms of a negative time differential coefficient of the engine speed which is produced as the result of engagement of the clutch and may be affected by the clutch temperature the worn condition of the clutch friction members. The output of the comparator 24 becomes low level in this instance. The high level output of the exclusive OR circuit 25 is applied to the AND circuit 31. Then, the AND circuit 31 generates a high level signal so that the transistor 32 is turned ON and the solenoid 12a of the holding valve 12 is energized. The holding valve 12 is therefore closed. Therefore, the vacuum chamber 5a of the diaphragm means 5 is closed, and the leftward movement of the clutch actuating member 4 is stopped to momentarily interrupt engaging movement of the clutch. At this time, the output of the NAND circuit 41 is at a low level and the output of the AND circuit 42 is also at a low level, so that the solenoid 11a of the control valve 11 is deenergized and the holding valve 12 is connected through the control valve 11 with the intake passage 1b. When the differential coefficient of the engine speed becomes zero or positive, the control valve 11 is opened to the atmosphere and since the holding valve 12 is opened as described above, the clutch is moved into engagement again. After the clutch has been engaged, a low level signal of the OR circuit 33 is applied to the AND circuit 31 so that further operation of the holding valve 12 is prohibited.

FIG. 4 shows an example of a computer program for use with an embodiment using a microcomputer in the place of the control circuit of the previous embodiment. The clutch switch turns OFF when the driver's hand has been removed from the transmission shift lever, but turns ON when the driver's hand is placed on it.

According to the embodiments described above the transmission 3 is controlled manually, but the transmission 3 may be controlled automatically by means of an electric control device on the like.

Referring now to FIG. 5, the embodiment shown therein includes a restriction orifice 60 provided between a line 7a extending between the vacuum chamber 5a of the diaphragm actuator 5 and the holding valve 12. A bypass line 61 is provided in parallel with the orifice 60 and a solenoid type speed control valve 62 is in the bypass line. The valve 62 functions when energized by the current from the servo amplifier 21 to open the bypass line 61.

FIG. 6 shows the details of the control circuit 13. The control circuit 13 is substantially the same as that shown in FIG. 2 so that detailed descriptions will be omitted by simply showing the corresponding parts by the same reference characters.

In the embodiment shown in FIG. 6, the output of the differentiation circuit 23 is connected with an inversion amplifier 50 so that the output $e_d$ is to inverted. The inverted output $e_d$ is applied to a comparator 51 where it is compared with a reference voltage $V_{r3}$. The comparator 51 thus generates a positive signal when the output $e_d$, which represents the differential coefficient of the engine speed, is larger than a predetermined value K1, and a zero signal when it is not larger than the value K1. The output $e_{03}$ of the comparator 35 is applied to a comparator 48 where it is compared with a reference voltage $V_{r2}$ which is larger than the voltage $V_{r1}$, so that the comparator 48 generates a high level signal when the output $e_{03}$ is larger than the valve $V_{r2}$, and a low level signal when the output $e_{03}$ is not larger than the valve $V_{r2}$. The outputs of the comparators 48 and 51 are applied to input terminals of an OR circuit 52 which produces an output which is in turn applied to the base of a switching transistor 53. The switching transistor 53 functions to energize the solenoid 62a of the speed control valve 62 in order to open the speed control valve 62 when the output of the OR circuit 52 is at a high level.

In operation under a circumstance wherein the differential coefficient of the engine speed is comparatively large, when the accelerator pedal is actuated to start the automobile to run, the engine speed starts to increase from the idling speed as shown by a full line in FIG. 7. At the same time, the accelerator pedal switch 18 turns ON so that the accelerator pedal signal is applied to the exclusive OR circuit 25 and the OR circuit 37. Since the differential coefficient of the engine revolution is positive, the output $e_a$ of the comparator 24 turns to a high level and the exclusive OR circuit 25 generates a low level signal. At the starting period of the automobile, the speed is lower than a predetermined value and the AND circuit 38 generates a high level signal. At this time, the clutch has not been engaged so that the OR circuit 33 generates a high level signal. In this state, the NAND circuit 41 generates a high level signal and the AND circuit 42 also generates a high level signal, so that the solenoid 11a of the control valve 11 is energized and the control valve 11 is opened to the atmosphere. The AND circuit 31 generates a low level signal and the solenoid 12a of the holding valve 12 is therefore deenergized so that the holding valve 12 is opened. Since the output $e_d$ of the differentiation circuit 23 is higher than the reference voltage $V_{r3}$ of the comparator 51 as shown in FIG. 7(b), the comparator 51 generates a high level signal. Then, the solenoid 62a of the speed control valve 62 is energized to the speed control valve 62. As a result, atmospheric pressure is introduced into the vacuum chamber 5a of the diaphragm actuator 5 through the control valve 11 and the clutch starts to be engaged. In this instance, since the speed control valve 62 is opened, the pressure in the chamber 5a is increased quickly and the clutch actuating member 4 moved quickly as shown in FIG. 7(c). As the clutch is thus connected gradually, the automobile speed goes up gradually as shown by a broken line in FIG. 7(a).

As the automobile runs and the engine load increases, the differential coefficient of the engine speed decreases. If the engine load becomes excessively high the engine speed decreases as shown by the full line in FIG. 7(a). The decrease in the engine speed is then detected in terms of a negative differential coefficient. The output of the comparator 24 is at a low level and the high level output of the exclusive OR circuit 25 is applied to the AND circuit 31. Then, the AND circuit 31 generates a high level signal and the transistor 36 turns ON so that the solenoid 12a of the holding valve 12 is energized to thereby close the holding valve 12. Therefore, the vacuum chamber 5a of the diaphragm actuator 5 is closed and the clutch actuating member 4 stops its leftward movement. At this time, the output of the NAND circuit 41 is at a low level and the output of the AND circuit 42 is also at a low level, so that the solenoid 11a of the control valve 11 is deenergized and the holding valve 12 is therefore communicated with the intake passage 1b through the vacuum line 7. When the differential coefficient of the engine speed becomes zero or positive, the control valve 11 is opened to the atmosphere and the holding valve 12 is opened so that the clutch starts to be engaged again. After the clutch has been engaged, the low level signal of the OR circuit 33 is applied to the AND circuit 31 so that further operation of the holding valve 12 is prohibited.

Under a circumstance wherein the differential coefficient of the engine speed is comparatively small, when the output $e_d$ of the differentiation circuit 23 is lower than the reference voltage $V_{r3}$, the output of the comparator 51 is at a low level and the output of the comparator 48 is at a low level because the automobile speed is low. Then, the output of the OR circuit 52 is at a low level and the transistor 53 turns OFF so that the solenoid 62a is deenergized. Accordingly, the speed control valve 62 is closed so that the communication between the vacuum chamber 5a and the atmosphere is established only through the line 7a having the orifice 60. In this condition, the clutch actuating member 4 is moved slowly, and therefore the clutch is connected slowly as shown in FIG. 8(c). Even in this course of operation the holding period may be provided in the movement of the member 4 as described with reference to FIG. 7. When the automobile speed increases beyond a predetermined value, the output of the comparator 48 is at a high level so that the transistor 53 turns ON and the solenoid 62a is energized to thereby open the speed control valve 62. Accordingly, the atmospheric pressure is introduced into the vacuum chamber 5a through the line 7a and the bypass line 61. As mentioned above, in a case where the differential coefficient of the engine speed is small, the clutch is connected slowly to thereby prevent the engine speed from slowing down frequently.

FIG. 9 shows an example of a computer program which is used in an embodiment adopting a microcomputer in the place of the control circuit. The clutch switch turns OFF when the driver's hand has been removed from the transmission shift lever, while the clutch switch turns ON when the driver's hand is placed on it.

The invention has thus been shown and described with reference to specific embodiments, however, it should be noted that the invention is in no way limited to the details the illustrated structures but changes and modifications may be made without departing from the scope of the appended claims.

We claim:

1. A clutch assembly comprising a driving member and a driven member which are adapted to be brought into frictional engagement with each other, clutch actuating means for bringing said driving and driven members into mutual frictional engagement, control means including detecting means for detecting the rate of decrease in engine speed and producing an output representing the engine speed decrease rate, means responsive to the output of the detecting means for stopping the movement of said clutch actuating means when a decrease in the engine speed is detected during the engaging operation of the clutch actuating means, said detecting means being provided with means for detecting a positive differential coefficient of the engine speed and generating an output, said control means including means to allow the clutch actuating means to perform the clutch engaging operation when said detecting means detects a positive differential coefficient of the engine speed.

2. A clutch assembly in accordance with claim 1 in which said control means includes means for controlling a clutch engaging speed in accordance with the differential coefficient of the engine speed.

3. A clutch assembly in accordance with claim 1 in which said control means includes means for increasing the clutch engaging speed in response to an increase in the differential coefficient of the engine speed .

4. A clutch assembly in accordance with claim 1 in which said clutch actuating means includes a fluid operated actuator.

5. A clutch assembly in accordance with claim 4 in which said control means includes control valve means for alternately connecting the actuator to a source of pressure and opening it to atmosphere and holding valve means for holding pressure in the actuator.

6. A clutch assembly in accordance with claim 2 in which said clutch engaging speed control means includes control valve means for controlling fluid flow to said clutch actuating means.

7. A clutch assembly comprising a driving member and a driven member which are adapted to be brought into frictional engagement with each other, clutch actuating means for bringing said driving and driven members into mutual frictional engagement, control means including detecting means for detecting a positive and a negative differential coefficient of engine speed and producing an output representing the differential coefficient of the engine speed, said detecting means including means for detecting actuation of an engine control member, said control means including means responsive to the output of the detecting means to allow the clutch actuating means to perform the clutch engaging operation when said detecting means detects a positive differential coefficient of the engine speed but restrains the clutch actuating means from performing the clutch engaging operation when said detecting means detects a negative differential coefficient of the engine speed under the actuation of the engine control member.

8. A clutch assembly in accordance with claim 7 in which said control means includes means responsive to actuation of a transmission gear shift means to operate the clutch actuating means to disengage the clutch assembly when the shift means is in a neutral position and when the shift means is being actuated.

* * * * *